(12) United States Patent
Ritter

(10) Patent No.: US 7,993,188 B2
(45) Date of Patent: Aug. 9, 2011

(54) VARIABLE RATE DIVERTER FOR A CROP RESIDUE COLLECTING DEVICE CARRIED BY A COMBINE HARVESTER

(75) Inventor: Aaron Scott Ritter, Milan, IL (US)

(73) Assignee: Deere & Company, Moline, IL (US)

( * ) Notice: Subject to any disclaimer, the term of this patent is extended or adjusted under 35 U.S.C. 154(b) by 221 days.

(21) Appl. No.: 12/481,154

(22) Filed: Jun. 9, 2009

(65) Prior Publication Data

US 2010/0311481 A1    Dec. 9, 2010

(51) Int. Cl.
*A01F 12/30*    (2006.01)
(52) U.S. Cl. ........................................ 460/111; 460/112
(58) Field of Classification Search ................... 56/13.3, 56/13.4, 16.6; 460/111–115; 241/55, 238
See application file for complete search history.

(56) References Cited

U.S. PATENT DOCUMENTS

| | | | |
|---|---|---|---|
| 2,865,416 A * | 12/1958 | Hetteen | 241/238 |
| 3,186,460 A * | 6/1965 | Frederick | 239/650 |
| 4,921,469 A * | 5/1990 | Scharf | 460/10 |
| 6,238,286 B1 | 5/2001 | Aubry et al. | |
| 6,656,038 B1 * | 12/2003 | Persson | 460/112 |
| 7,220,179 B2 * | 5/2007 | Redekop et al. | 460/112 |
| 7,306,174 B2 | 12/2007 | Pearson et al. | |
| 7,559,833 B2 * | 7/2009 | Isaac et al. | 460/111 |
| 7,651,391 B2 * | 1/2010 | Weichholdt et al. | 460/111 |
| 7,731,578 B2 * | 6/2010 | Birrell et al. | 460/100 |
| 2002/0142814 A1 | 10/2002 | Niermann | |
| 2003/0017861 A1 | 1/2003 | Niermann et al. | |
| 2003/0162576 A1 | 8/2003 | Bueermann | |
| 2004/0242291 A1 | 12/2004 | Weichholdt | |
| 2008/0207288 A1 | 8/2008 | Isaac | |
| 2008/0248843 A1 | 10/2008 | Birrell et al. | |
| 2009/0019826 A1 | 1/2009 | Rigney | |
| 2009/0042626 A1 | 2/2009 | Weichholdt et al. | |
| 2009/0113867 A1 | 5/2009 | Birrell et al. | |

FOREIGN PATENT DOCUMENTS

WO    03/039238 A1    5/2003

OTHER PUBLICATIONS

European Search Report dated Sep. 20, 2010, (4 pages).

* cited by examiner

*Primary Examiner* — Alicia M Torres

(57) ABSTRACT

A crop residue handling device is mounted to the rear of a combine harvester for intercepting crop residue that remains after grain has been separated from the crop by the separator and cleaning arrangement of the harvester. The residue handling device includes a chopper which chops and impels the chopped residue rearwardly through a discharge duct. A transition duct receives the crop exiting from the chopper and contains upright deflector vanes mounted for pivoting and being automatically moved among desired positions, by a power actuator so as to direct desired proportions of the crop residue between a blower for receiving and accelerating the crop through a discharge chute for collection in a receptacle of a towed trailer, and a pair of spreader disks located at opposite sides of the blower for receiving and dispersing the crop residue on the ground.

12 Claims, 5 Drawing Sheets

VARIABLE RATE DIVERTER FOR A CROP RESIDUE COLLECTING DEVICE CARRIED BY A COMBINE HARVESTER

FIELD OF THE INVENTION

The present invention relates to collecting crop residue discharged from a combine harvester, and more specifically relates to a way of diverting all or a selected portion of the crop residue from the collector so that it may be dispersed onto the ground.

BACKGROUND OF THE INVENTION

It is known to collect crop residue discharged from the back of a combine harvester and to convey the collected material into an in-field collection device. Further, it is known to provide a horizontal deflector door to split a flow of residue into upper and lower streams with the upper stream being collected and the lower stream being directed to spreader vanes which operate to disperse the lower stream onto the ground. A crop residue handling device of this type is disclosed in U.S. patent application Ser. No. 12/062,846, filed Apr. 4, 2008 and published as US 2008/0248843 on Oct. 9, 2008. This patent application discloses a control system for automatically varying the amount of the crop residue collected as a function of one or more of soil parameters, crop parameters or terrain parameters, which parameters are sensed "on the go" during the harvesting procedure and/or are provided in the form of previously garnered field mapping data which is used in conjunction with an on-board global positioning system to output desired control signals.

A refinement of the known residue handling device was developed which included a transverse wedge-shaped nose for intercepting crop from the horizontal deflector so as to split the crop into the upper and lower streams. While this usage of a wedge-shaped nose for splitting the residue flow worked satisfactorily in respective modes wherein all of the flow was collected or all of the flow was diverted, the operation was not satisfactory for varying the flow between these two extreme modes, and crop residue tended to hairpin on the splitting nose resulting in plugging.

The problem to be solved then is to provide an apparatus for splitting crop residue issuing from the back of a combine between a collection arrangement and a spreading arrangement while avoiding the drawbacks associated with the known splitter arrangement.

SUMMARY OF THE INVENTION

According to the present invention, a combine harvester is equipped with a crop residue handling arrangement including an improved crop residue flow splitting arrangement.

An object of the invention is to provide a crop residue flow splitting arrangement capable of establishing first and second extreme modes wherein all or none of the flow is permitted to pass on to a collection arrangement and for establishing a number of intermediate modes wherein the flow is split into side-by-side streams for allowing desired proportions of the flow to pass on to the collection arrangement or to a residue spreading arrangement.

This object is achieved by a crop residue handling arrangement including a crop residue chopper which discharges into a transition duct having a discharge end central region which is in communication with an accelerator for discharging crop into a collection receptacle, and opposite side regions which are respectively in communication with a pair of spreader disks for dispersing the crop residue upon the ground behind the combine. Located within the transition duct are a pair of substantially vertical deflector vanes having transversely spaced rear ends mounted for pivoting about respective upright axes located at opposite sides of an entrance to the accelerator. The deflector vanes are pivoted between a first extreme position, wherein their forward edges engage each other thereby completely blocking crop residue from entering the accelerator and splitting the flow into two streams which are respectively directed to the pair of spreader disks, and a second extreme position, wherein their forward ends are respectively located adjacent opposite sides of the discharge opening of the chopper whereby all of the crop residue is directed to the entrance of the crop residue accelerator. When the deflector vanes are in respective positions between the extreme positions, the crop residue flow is split in desired proportions between the accelerator and the pair of spreader disks.

The foregoing and other objects of the invention will be apparent from a reading of the following description together with the appended drawings.

DESCRIPTION OF THE PREFERRED EMBODIMENT

Figure 1:
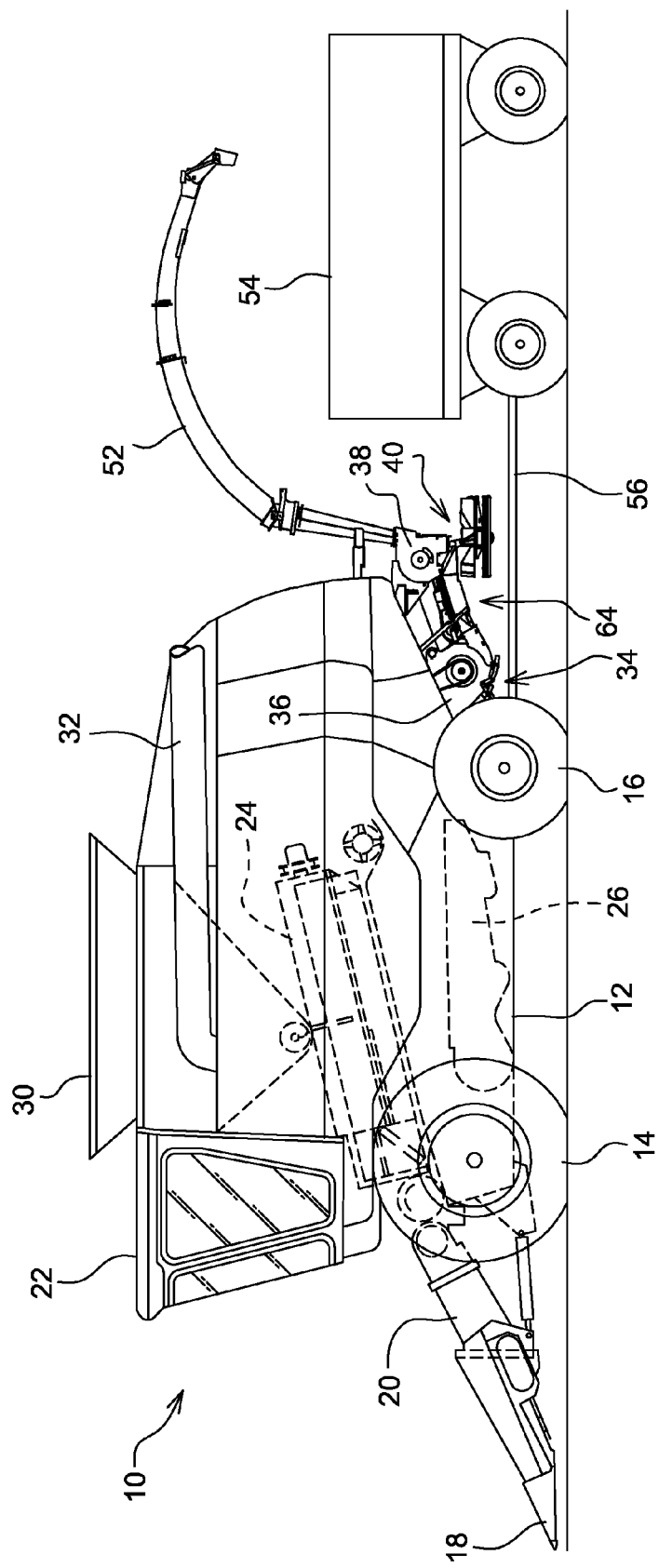
FIG. 1 is a schematic left side view of a combine harvester equipped with a crop residue handling arrangement of a type with which the present invention is particularly adapted for use.

Referring now to FIG. 1, there is shown a self-propelled combine harvester 10 including a main frame 12 supported on front and rear sets of wheels 14 and 16, respectively. A harvester head 18 is mounted to a feeder house 20 carried at the forward end of the frame 12 so as to be in full view of an operator seated in a cab 22 mounted on the frame 12 above a rear end of the feeder house 20. Stalks or stems of the standing crop being harvested is cut by the harvesting head 18 and conveyed rearwardly, with the attached grain heads or ears, through the feeder house 20 which, in turn, delivers this crop matter to a threshing system 24 located just behind the feeder house and which, in turn, feeds the threshed crop material to a cleaning and separating system 26. Grain that is separated by the system 28 gravitates to the bottom of the system and is conveyed by a grain elevator (not shown) to a holding tank 30 from which the grain can be periodically transferred to a container carried by a grain cart or truck (not shown) by an unloading conveyor 32 when the holding tank 30 becomes full.

Non-grain crop residue, such as stems, stalks, husks, leaves and cobs is conveyed to the rear from the cleaning and separating system 26. Mounted to the rear of the combine harvester 10 for receiving this crop residue is a crop residue handling arrangement 34 including a rotary chopper 36 for receiving crop directly from the cleaning and separating system 26, and a residue collection blower 38 and a pair of individually driven spreader disks 40 for receiving crop discharged by the chopper 36.

Figure 2:
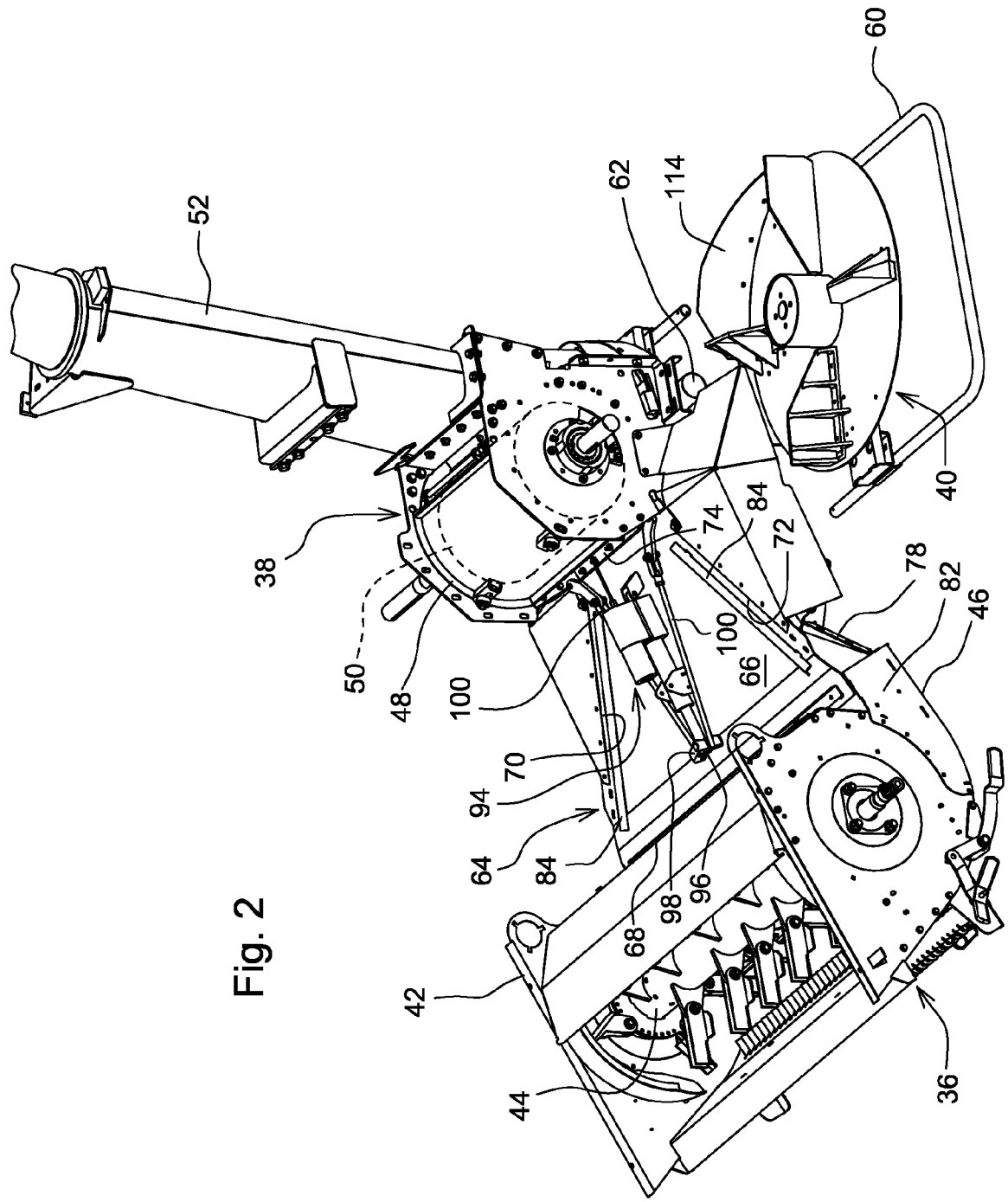
FIG. 2 is a left front perspective view of the crop residue handling arrangement including the transition duct in which is incorporated the deflector structure for splitting the flow of crop residue exiting the chopper in varying amounts between the residue collection blower and the pair of residue spreader disks.
Figure 3:
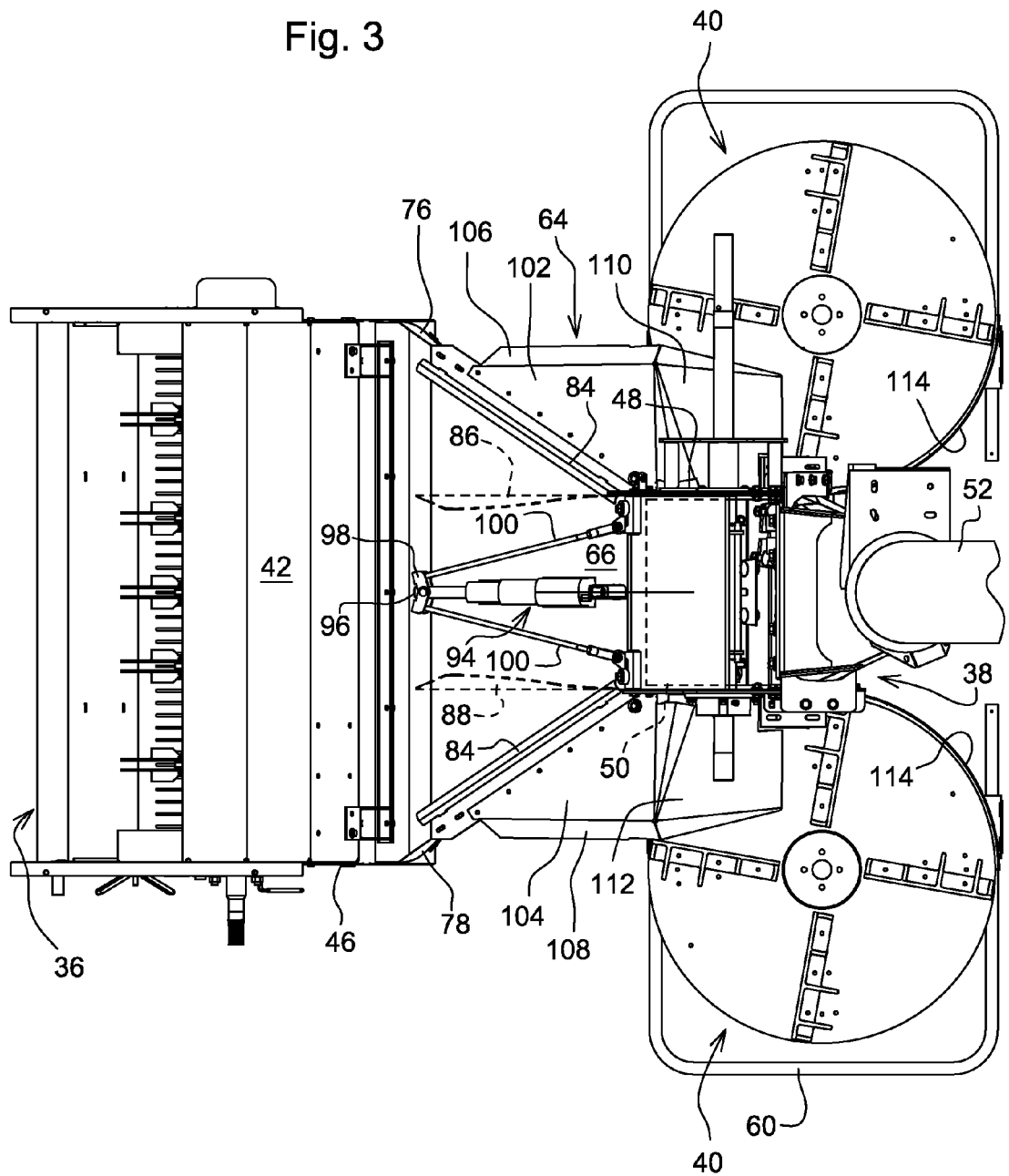
FIG. 3 is a top view of the crop residue handling arrangement shown in FIG. 2 with a central top section of the transition duct being removed to reveal underlying structure.

Specifically, referring now also to FIGS. 2 and 3, it can be seen that the chopper 36 includes a housing 42 including a forward region defining an inlet for receiving crop residue from the cleaning and separating system 26 and guiding it to a blade-carrying rotor 44 having a rear part of its circumference surrounded by a substantially cylindrical housing section, with this housing section having an outlet at a lower rear region thereof that is coupled to, and directs the chopped crop residue into, a discharge duct 46. The crop residue collection blower 38 is provided for the purpose of accelerating chopped crop residue received from the chopper 36. The blower 38 is spaced to the rear from the chopper discharge duct 46 and includes a cylindrical housing 48 encircling a blower rotor 50, including a lower front region defining a crop residue inlet and an upper rear portion defining a crop residue outlet, with the outlet being coupled to an upwardly and rearwardly extending discharge spout 52 having a discharge end oriented for depositing accelerated crop residue into a receptacle of a mobile cart 54 having a wheeled chassis coupled by a tongue 56 for being towed by the combine harvester 10. The pair of crop residue spreader disks 40 are respectively supported on opposite sides of the blower 38 by a support frame 60 suspended from opposite sides of the blower housing 48 by right and left tubular support members with only the left support member 62 being visible (FIG. 2).

Embodying the present invention and located in the space between the chopper discharge duct 46 and the inlet of blower housing 48 and the two spreader disks 40 is a transition duct 64 including a top wall comprising a central top wall section 66 including a front edge 68 extending the width of the chopper 36 and being fixed to the top of the discharge duct 46. Opposite ends of the front edge 68 are respectively joined to right and left edges 70 and 72 of the central wall section, the edges 70 and 72 converging to a rear edge 74 having the width of the blower housing 48 and being fixed to a top of the blower inlet. Joined to and depending from the top wall section 66 at outer front regions are right and left, rearwardly converging, upright crop deflectors 76 and 78, respectively, each of which includes approximately a forward half which overlaps a bottom extension 80 of the chopper discharge duct 46, with front edges of the deflectors 76 and 78 abutting respective inside surfaces of opposite vertical side walls 82 of the duct 46, only the left wall 82 being visible in FIG. 2. A pair of right-angle stiffener members 84 is fixed to the top wall section 66 so as to respectively extend parallel to, and be spaced inwardly from, the side edges 70 and 72 of the top wall section 66.

Figure 4:
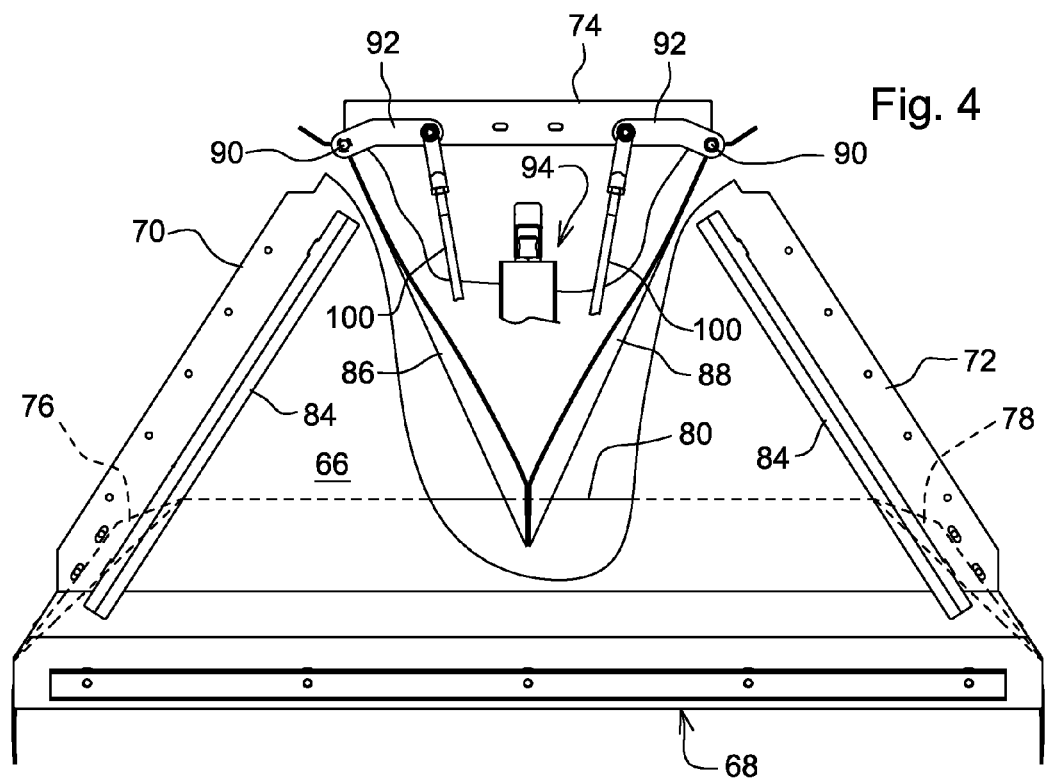
FIGS. 4-6 are top views of that portion of the transition duct incorporating the defector structure and respectively showing the structure in a first extreme position for deflecting all of the crop residue to the spreader disks, a second extreme position for deflecting all of the crop residue to the residue collection blower, and an intermediate position dividing the flow of crop material between the spreader disks and collection blower.
Figure 5:
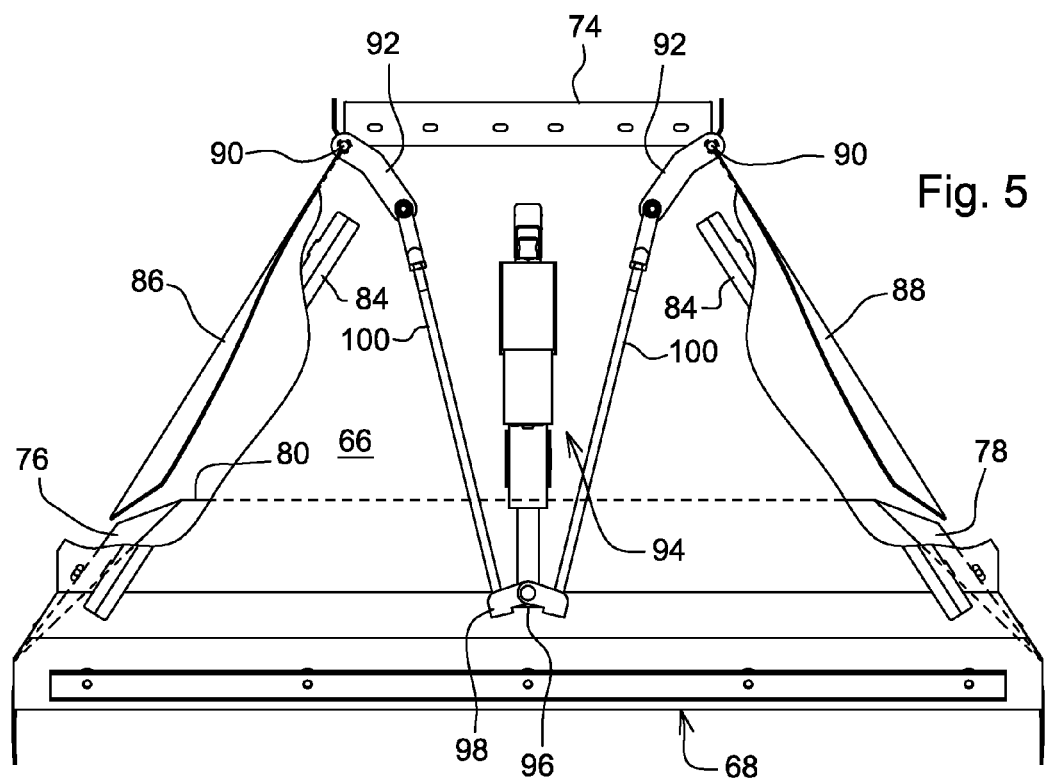
Figure 6:
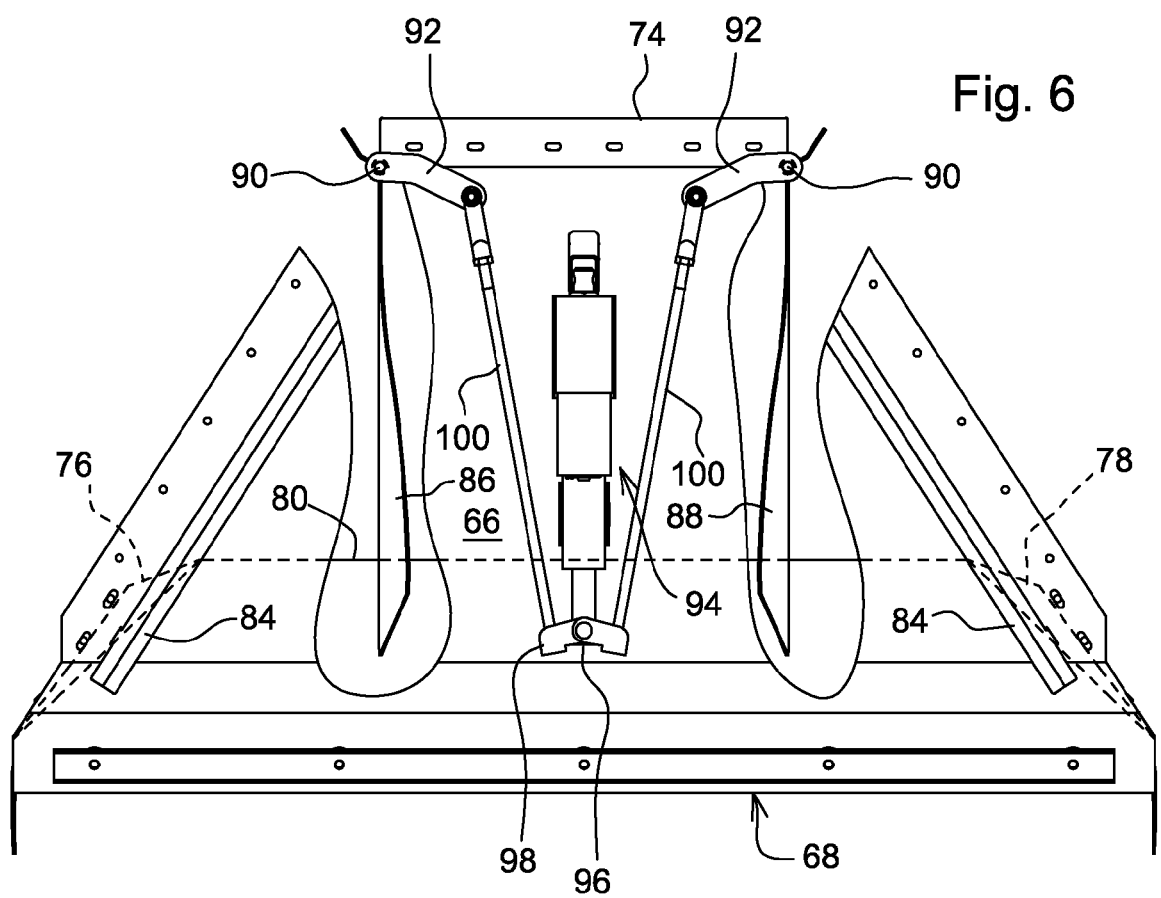

Referring now also to FIGS. 4-6, it can be seen that right and left, upright crop residue deflector vanes 86 and 88 are located beneath the central top wall section 66 of the transition duct 64. Each of the deflector vanes 86 and 88 has an upright pivot rod 90 joined to a rear edge thereof and being mounted at opposite ends of the inlet to the blower housing 48 for pivoting about respective upright axis disposed perpendicular to the top wall section 66. The pivot rods 90 project above the top wall section 66 and fixed to each of the rods is one end of an inwardly projecting lever 92. Mounted to the top of the top wall section 66 so as to extend fore-and-aft along a central region of the top wall section 66 is an extensible and retractable electric actuator 94 having a forwardly directed output rod 96 having a forward end region fixed a yoke 98 having opposite ends respectively coupled to inner ends of the levers 92 by a pair of motion-transfer members 100 defined by rods.

Thus, it will be appreciated that extension and retraction of the actuator 94 will result in the deflector vanes 86 and 88 pivoting about the axes of the pivot rods 90 among various angular positions including a first extreme position wherein forward ends of the deflector vanes 86 and 88 are in engagement with each other, as shown in FIG. 4, wherein all the chopped crop residue exiting the chopper 36 is blocked from entering the crop collection blower 38, and a second extreme position wherein the forward ends of the deflector vanes 86 and 88 are respectively located slightly outwardly of rear ends of the crop deflectors 76 and 78 and direct all of the chopped crop residue exiting the chopper 36 to the collection blower 38.

Referring back to FIGS. 2 and 3, it can be seen that the transition duct 64 further includes right and left top wall sections 102 and 104, respectively, having inner edges fixed to the outer edges 70 and 72 of the central top wall section 66 and respectively having outer fore-and-aft extending edges spaced apart a distance only slightly less than a width of said chopper 36 and being joined to respective side walls 106 and 108, which are inclined slightly outwardly form top to bottom. The top wall sections 102 and 104 respectively include respective rear regions 110 and 112 that extend beside the blower housing 48 and above inner front quarter regions of the spreader disks 40, as viewed in FIG. 3, with these top wall section being inclined downwardly toward the rear. Provided about an inner rear quarter region of each of the spreader disks 40 is a curved upright baffle 114 that prevents chopped crop residue from passing rearwardly beyond the spreader disks.

In a manner taught by the aforementioned U.S. Patent Application Publication No. 2008/0248843, the linear electric motor 94 is automatically controlled so as to vary the amount of chopped crop residue passing to each of the collecting blower 38 and the pair of spreader disks 40 in accordance with various soil, crop and terrain parameters, which are sensed on the go and/or are provided by geo-referenced field maps that have been previously generated and placed into the memory of an electronic control unit.

Having described the preferred embodiment, it will become apparent that various modifications can be made without departing from the scope of the invention as defined in the accompanying claims.

The invention claimed is:

1. In a crop residue handling arrangement adapted for being mounted to a rear end of a combine harvester and including a rotary chopper having a bladed rotor mounted within a chopper housing with the chopper housing defining an inlet for guiding crop residue to the rotor and a discharge duct for directing a stream of chopped crop residue rearwardly; a blower including a blower rotor mounted within a blower housing located centrally behind, and spaced to the rear from, said chopper and defining a forwardly opening inlet for receiving said stream of chopped crop residue exiting said discharge duct of said chopper, and defining an upwardly and rearwardly disposed discharge spout for directing crop residue to a collecting receptacle; and a pair of spreader disks being respectively mounted on opposite sides of said blower; and a transition duct arrangement being mounted between said chopper and said blower and pair of spreader disks, the improvement comprising: said transition duct arrangement including a top wall having a forward edge connected to a top of said chopper discharge duct and having a rear edge spaced vertically above said pair of spreader disks, and a pair of side walls being respectively joined to opposite sides of said top wall and extending forwardly from opposite ends of said rear edge; and right and left upright crop residue deflector vanes located beneath said top wall and having respective pivotal mountings at their rear ends for permitting the deflector vanes to pivot, about respective axes extending perpendicular to said top wall at respective locations at opposite sides of said inlet to said blower housing, between a first extreme position, wherein forward ends of the deflector vanes engage each other thereby preventing said stream of chopped crop residue from entering said blower housing while dividing said stream into first and second parts that are respectively directed to said pair of spreader disks by said vanes and said opposite side walls, and a second extreme position, wherein said forward ends of said deflector vanes are located at opposite sides of said stream of crop residue, whereby the entire stream is directed to said blower; and a power actuator being coupled to said right and left deflector vanes for moving said vanes between said first and second extreme positions.

2. The crop residue handling arrangement, as defined in claim 1, wherein said pivotal mountings each include an upright rod fixed along a rearward end of a respective one of said right and left deflector vanes, with the upright rods respectively being located along said respective axes; each upright rod having an upper end region projecting above said top wall; a lever being fixed to said upper end region of each rod; and said power actuator being mounted to said top wall and coupled to said pair of levers.

3. The crop residue handling arrangement, as defined in claim 2, wherein said power actuator is an extensible and retractable power actuator.

4. The crop residue handling arrangement, as defined in claim 3, wherein said power actuator is a linear electric motor disposed along a longitudinal centerline of said top wall and including a forwardly projecting output rod; a yoke being fixed to a forward region of said output rod; and a pair of motion transfer members being coupled between said yoke and respective ends of said levers.

5. The crop residue handling arrangement, as defined in claim 1, wherein said blower has a width which is less than a width of said chopper; and said top wall including opposite rear end regions respectively located above said pair of spreader disks and being sloped downwardly from front to rear.

6. The crop residue handling arrangement, as defined in claim 1, wherein said blower has a width which is less than a width of said chopper; and a pair of rearwardly converging, upright deflector panels being located beneath, and mounted to opposite rear regions of, said top wall in at least partial overlapping relationship to said opposite side walls.

7. The crop residue handling arrangement, as defined in claim 1, wherein said opposite side walls are inclined downwardly and outwardly from said top wall.

8. The crop residue handling arrangement, as defined in claim 1, wherein said opposite side walls are spaced apart from each other a distance no greater than that between respective center axes of said pair of spreader disks.

9. A crop residue handling arrangement adapted for being mounted to a combine harvester in symmetrical relationship to a vertical plane passing through a longitudinal center of the harvester, comprising: a crop residue chopper having a forwardly opening inlet and a rearwardly directed discharge duct; a blower spaced rearward of, and being centered relative to, said chopper and including a blower inlet in a lower front region of said blower; a pair of crop residue spreader disks being respectively located on opposite sides of, and spaced below, said blower inlet; a transition duct arrangement being located between said chopper and said blower and spreader disks, the transition duct including a top wall having a forward end fixed to a top wall of said chopper discharge duct so that chopped crop residue exiting from said chopper is directed along an inside surface of said top wall; said top wall having a rear end having opposite end regions respectively extending above said pair of spreader disks and defining a U-shaped rearwardly-opening recess joined to said opposite end regions, with a bottom of said recess being fixed to an upper edge of said blower inlet; said lower front region of said blower being located in said recess; a pair of upright side walls respectively being joined to opposite sides of said top wall and extending forwardly from opposite ends of said rear end; an upright deflector vane arrangement being mounted under said top wall for movement among various positions for varying the amount of said chopped crop residue which reaches said blower and said pair of spreader disks, including a first extreme position wherein all of said chopped crop residue is directed to said blower for collection, and a second extreme position wherein all of said chopped crop residue is directed to said pair of spreader disks for being dispersed onto the ground; and a power actuator being coupled to said upright vane arrangement for selectively moving said vane arrangement among said various positions, including said first and second extreme positions.

10. The crop residue handling arrangement, as defined in claim 9, wherein said upright deflector vane arrangement comprises right and left, upright crop residue deflector vanes mounted for pivoting about respective upright axes located adjacent opposite sides of said blower inlet, with said upright crop residue deflector vanes having respective forward ends which are spaced transversely from each other by a distance approximately equal to a width of said chopper when said vane arrangement is placed in said first extreme position, and which are engaged with each other when said vane arrangement is placed in said second extreme position.

11. The crop residue handling arrangement, as defined in claim 10, wherein said power actuator is an extensible and retractable actuator.

12. The crop residue handling arrangement, as defined in claim 11, wherein said power actuator is an electric linear motor.

* * * * *